US010024598B2

(12) United States Patent
Kreuzer

(10) Patent No.: US 10,024,598 B2
(45) Date of Patent: Jul. 17, 2018

(54) FEEDING DEVICE OF A BELT DRYING INSTALLATION AND METHOD FOR CONTROLLING A FEEDING DEVICE

(71) Applicant: HAARSLEV INDUSTRIES GMBH, Bruchsal (DE)

(72) Inventor: Gerd Kreuzer, Sulzfeld (DE)

(73) Assignee: HAARSLEV INDUSTRIES GMBH, Bruchsal (DE)

(*) Notice: Subject to any disclaimer, the term of this patent is extended or adjusted under 35 U.S.C. 154(b) by 0 days.

(21) Appl. No.: 15/520,023

(22) PCT Filed: Oct. 14, 2015

(86) PCT No.: PCT/EP2015/073804
§ 371 (c)(1),
(2) Date: Apr. 18, 2017

(87) PCT Pub. No.: WO2016/059123
PCT Pub. Date: Apr. 21, 2016

(65) Prior Publication Data
US 2017/0328635 A1 Nov. 16, 2017

(30) Foreign Application Priority Data

Oct. 18, 2014 (EP) .................................... 14189458
Jan. 18, 2015 (DE) ....................... 10 2015 200 680

(51) Int. Cl.
*F26B 13/14* (2006.01)
*F26B 13/12* (2006.01)
(Continued)

(52) U.S. Cl.
CPC .............. *F26B 13/145* (2013.01); *A01C 3/00* (2013.01); *B01D 53/78* (2013.01); *C02F 11/123* (2013.01); *F26B 13/12* (2013.01)

(58) Field of Classification Search
CPC .......... F26B 13/145; F26B 13/12; A01C 3/00; B01D 53/78; C02F 11/123
(Continued)

(56) References Cited

U.S. PATENT DOCUMENTS 3,129,545 A * 4/1964 Sloan .................... B29C 51/267
                                                                53/511
5,463,819 A * 11/1995 Komori ..................... F26B 3/32
                                                                110/226
(Continued)

FOREIGN PATENT DOCUMENTS

CN          202322581 U      7/2012
CN          103623745 A      3/2014
(Continued)

*Primary Examiner* — Stephen M Gravini
(74) *Attorney, Agent, or Firm* — Laurence A. Greenberg; Werner H. Stemer; Ralph E. Locher

(57) ABSTRACT

A feeding device is provided for a belt drying installation for dump or sewage sludge material dewatered down to a pasty consistency. In the conveying path of the sludge material, a first roller having transverse grooves that are set back relative to the outer diameter of the roller and a guide device are arranged relative to the outer diameter of the first roller such that when the roller is rotated the sludge material is drawn into the transverse grooves and is shaped to elongated extrudates. The first roller is associated with a comb which has teeth that rigidly engage the transverse grooves and which sweeps the extrudates from the transverse grooves, wherein the tips of the teeth which rigidly engage the transverse grooves define a line of engagement. The tooth tips which rigidly engage the transverse grooves are beveled towards the tooth neck.

18 Claims, 3 Drawing Sheets

(51) Int. Cl.
*C02F 11/12* (2006.01)
*B01D 53/78* (2006.01)
*A01C 3/00* (2006.01)

(58) Field of Classification Search
USPC .......................................... 34/179; 210/315
See application file for complete search history.

(56) References Cited

U.S. PATENT DOCUMENTS

| | | | | |
|---|---|---|---|---|
| 5,611,150 | A * | 3/1997 | Yore, Jr. | F26B 5/08 |
| | | | | 34/128 |
| 5,987,769 | A * | 11/1999 | Ackerman | F26B 5/08 |
| | | | | 210/257.1 |
| 6,065,224 | A * | 5/2000 | Eigner | C05F 17/0247 |
| | | | | 34/135 |
| 7,171,762 | B2 * | 2/2007 | Roberts | B29B 9/16 |
| | | | | 34/166 |
| 7,431,165 | B1 * | 10/2008 | Svehaug | B01D 29/01 |
| | | | | 210/411 |
| 7,987,613 | B2 * | 8/2011 | Ness | C10L 9/08 |
| | | | | 110/249 |
| 8,037,618 | B2 * | 10/2011 | Hehenberger | B29B 9/16 |
| | | | | 166/245 |
| 8,151,482 | B2 * | 4/2012 | Moss | F26B 3/06 |
| | | | | 159/16.1 |
| 8,205,350 | B2 * | 6/2012 | Aaron | F26B 5/08 |
| | | | | 34/58 |
| 8,932,467 | B2 * | 1/2015 | Fosbol | C13K 1/02 |
| | | | | 127/37 |
| 9,266,272 | B2 * | 2/2016 | Feichtinger | B01F 15/0289 |
| 9,347,705 | B2 * | 5/2016 | Crosset | F26B 17/005 |
| 9,598,653 | B2 * | 3/2017 | Bland | C10L 5/366 |
| 2008/0201978 | A1 | 8/2008 | Hammer | |
| 2013/0264264 | A1 * | 10/2013 | Lehoux | B01D 33/009 |
| | | | | 210/231 |
| 2015/0060341 | A1 * | 3/2015 | Mitchell | B01D 33/705 |
| | | | | 210/197 |
| 2015/0336031 | A1 * | 11/2015 | Lehoux | B30B 9/121 |
| | | | | 210/231 |
| 2017/0328635 | A1 * | 11/2017 | Kreuzer | F26B 13/145 |

FOREIGN PATENT DOCUMENTS

| | | | | |
|---|---|---|---|---|
| DE | 47162 | A1 | 8/1888 | |
| DE | 4013760 | C2 | 2/1992 | |
| DE | 202010007475 | U1 | 8/2010 | |
| DE | 112011100511 | A5 | 11/2012 | |
| DE | 102013221160 | A1 * | 5/2015 | ............ C02F 11/122 |
| DE | 102015200680 | A1 * | 4/2016 | ................ F26B 5/14 |
| GB | 786692 | A | 11/1957 | |
| JP | S609461 | A | 1/1985 | |
| JP | H07308698 | A | 11/1995 | |
| JP | 2881177 | B2 | 4/1999 | |
| JP | 2003227684 | A | 8/2003 | |
| JP | 2012179591 | A | 9/2012 | |
| WO | 2006075920 | A1 | 7/2006 | |
| WO | WO 2006075920 | A1 * | 7/2006 | ................ A01C 3/00 |

* cited by examiner

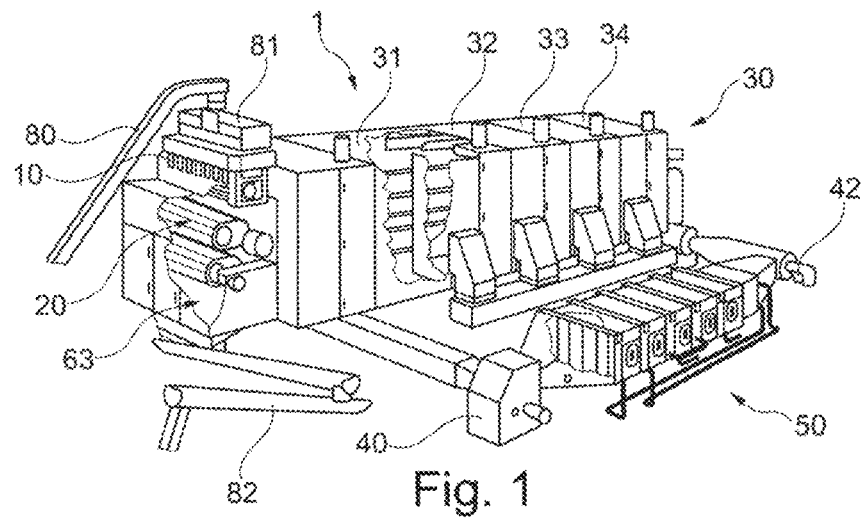
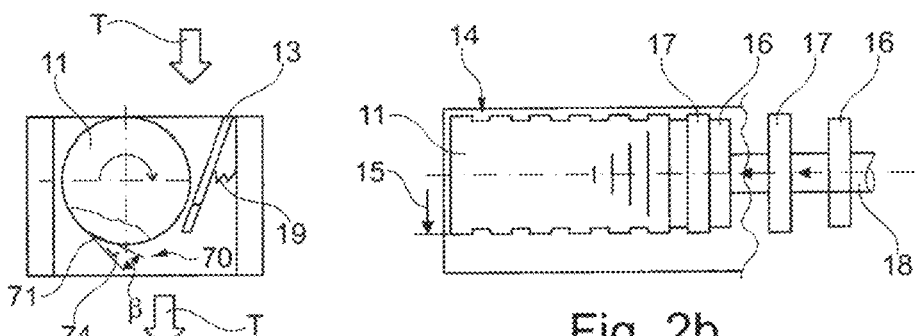
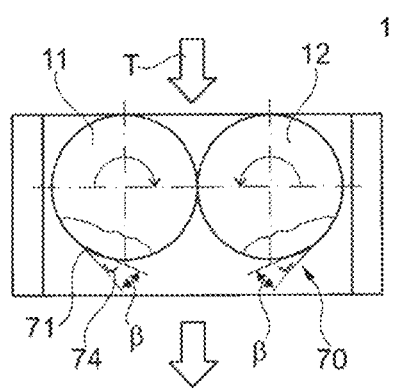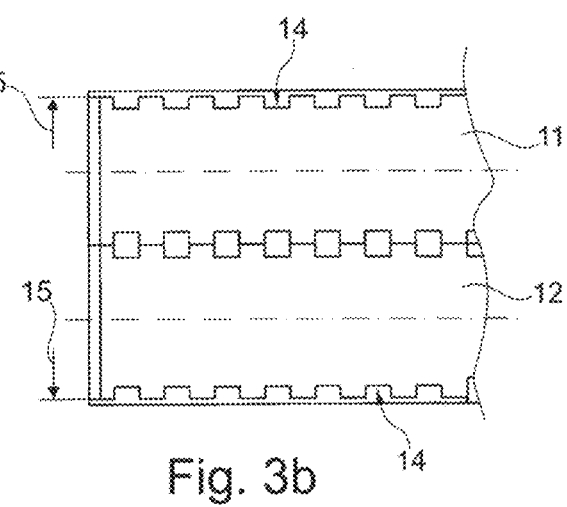
Fig. 1
Fig. 2a  Fig. 2b
Fig. 3a  Fig. 3b

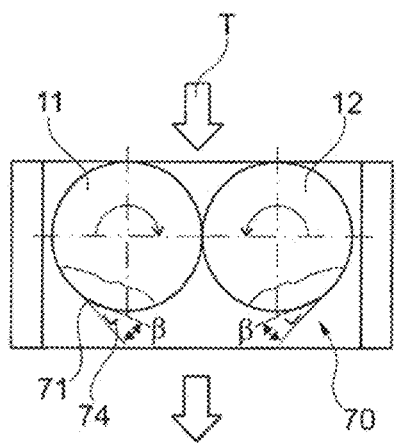
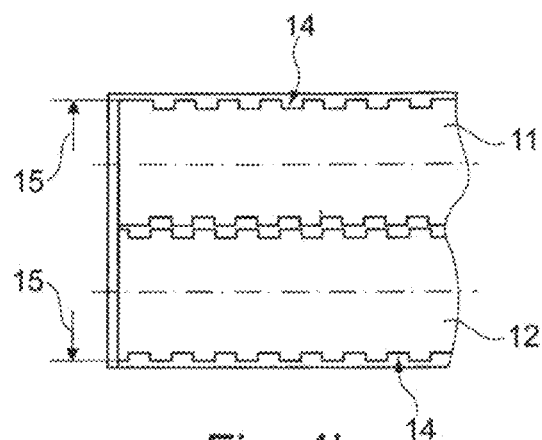
Fig. 4a
Fig. 4b
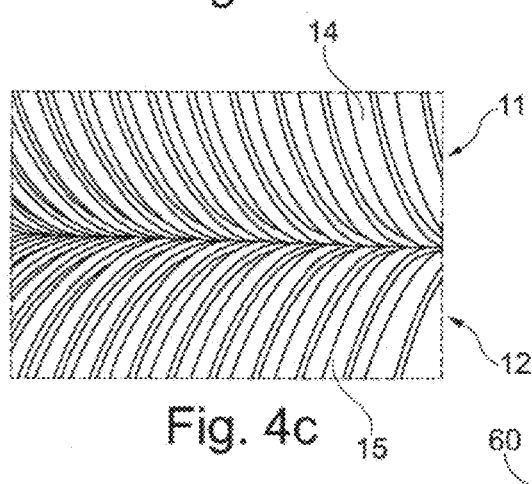
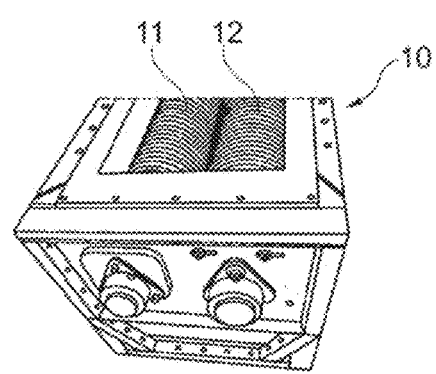
Fig. 4c
Fig. 4d
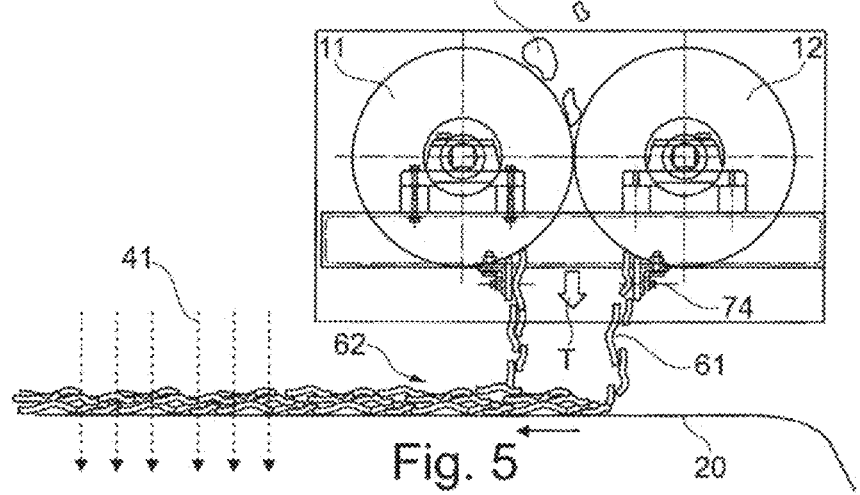
Fig. 5

FEEDING DEVICE OF A BELT DRYING INSTALLATION AND METHOD FOR CONTROLLING A FEEDING DEVICE

BACKGROUND OF THE INVENTION

Field of the Invention

The present invention relates to a feeding device of a belt drying installation for dump or sewage sludge material that has been dewatered to a pasty consistency and to a method for controlling such a feeding device.

Drying installations having a belt dryer as the core component (hereunder referred to as a belt drying installation) allow continuous drying methods based on the principle of convection to be carried out efficiently. As is shown in FIG. 1 by means of a typical belt drying installation 1 by the applicant, the material 60 to be dried herein continuously as a pile 62 that is as uniform as possible is fed by means of an infeeding conveyor unit 80, a metering unit 81, and by means of a feeding device 10 that is disposed in the transportation path T and is adapted to the material 60 onto an air-permeable conveyor belt 20. Feeding as a pile 62 has the effect of an enlargement of the specific surface area of the material 60 to be dried, this being a precondition for the intensive evaporation of water and optimal drying.

Following distribution onto the transportation belt 20, the pile 62 in a gentle and static manner runs through a tunnel-type drying zone 30, said pile 62 at the end of the latter being dropped as dried goods 63 onto an outfeeding conveyor unit 82. Both the mechanical wear on the installation 1 as well as the formation of dust accumulations are reduced and the risk of any explosion is thus eliminated by avoiding any friction of the pile 62.

The drying zone 30 is usually subdivided into individual drying chambers 31, 32, . . . The pile 62 in the individual chambers 31, 32, . . . of the drying zone 30 is perfused by hot air 41 which in most fields of application is guided in circulation by a ventilation system 40. The modular construction of a drying zone 30 from chambers 31, 32, . . . enables capacity to be readily expanded by inserting additional drying chambers 33, 34, . . . Drying is performed in the low-temperature range at approx. 80 to 140° C.

The air that is humidified in the belt dryer 1 is evacuated from the drying zone 30 by means of an exhaust air blower 42 and is guided through a series of heat exchangers 50: a first of the latter lowering the temperature of the drying air; the air being further cooled in a second condenser stage; the vapors being condensed on account thereof. The recirculated air is subsequently heated again in a third stage. This system enables the dryer exhaust air to be largely recycled and the energy requirement to be reduced by internal heat recovery.

Known belt drying installations usually operate at high availability in a safe temperature range. The former can be individually adapted to existing energy sources (steam, hot water, thermal oil, natural gas, heating oil, exhaust heat from the operation of CHP plants, gas engines, engine exhaust gas) such that available energy can be utilized in an optimal manner. To the extent that exhaust gases are to be employed as an energy source, reference is made pertaining to the environmentally friendly preparation of said exhaust gases to the entire cleansing method as disclosed by the applicant in DE 11 2011 100 511 A5.

Industrial or communal sludge material which is generated in open dump ponds or water treatment plants, etc., is often contaminated with the most varied of foreign matter such as, for example, metallic particles, rocks, hair, bristles, ear swabs, roots, pieces of timber, plastics parts, or the like.

To the extent that sludge material is to be used as goods to be dried, it is known for the former to be dewatered to a pasty consistency.

Furthermore, units for forming sausage-shaped moldings from pasty sludge material, which are configured as a feeding device of a belt drying installation and squeeze the previously dewatered sludge material through a perforated die, for example with the aid of a ram, are known from JP 2012-179591 A for example. Sausage-shaped moldings which are infed to a belt dryer for the purpose of effectively drying the sausage-shaped moldings are created herein.

However, when sludge material that is dewatered to a pasty consistency is conveyed through a perforated die there is the risk of individual passage bores being clogged by virtue of the foreign matter that is usually included in the sludge material. This is also the case when the sludge material has previously been squeezed through a screen and has been largely relieved of coarse foreign matter, the dimensions of the latter being larger than the diameter of the passage bores in the perforated die. In particular, hairs or other fibrous impurities such as bristles, plastics threads, or wood fibers, etc., are often by way of one end thereof pushed through another passage bore of the perforated die than by way of the other end thereof. This leads to a constriction of the cross section and subsequently to clogging of the passage bores, with the consequence that perforated dies of this type have to be cleaned frequently.

In order for clogging of this type by virtue of fibrous impurities to be avoided or eliminated, respectively, a perforated die that is embodied in two parts is known from DE 40 13 760 C2, for example, wherein an upper part of the perforated die is configured as a shearing plate that bears on the main face of a main part and is disposed so as to be displaceable in a reciprocating manner on the main part of the die, such that fibrous impurities that are included in the sludge material and adhere to and in the passage bores are sheared.

The passage holes mentioned extend through both the main part as well as the shearing plate. However, to the extent that a perforated die that is configured in such a manner in two parts is impacted by coarse foreign matter such as in particular crown caps, small rocks, or equivalent non-shearable foreign matter, the process for producing the sausage-shaped moldings has to be interrupted, as before. Therefore, the known installation is also not capable of continuous production while the non-shearable foreign matter is being removed. A substantially continuous operation is thus not guaranteed.

Furthermore, a feeding device of a belt drying installation for dump or sewage sludge material that has been dewatered to a pasty consistency in which in the transportation path of the sludge material at least one first roller having transverse grooves that are set back in relation to the external diameter of said first roller, and at least one guiding means relative to the external diameter of the first roller, are disposed such that when the first roller is rotated the sludge material is drawn into the transverse grooves and molded into elongate extruded pressings, are known from JP 2003-227684 A or from CN 103 623 745 A, for example.

By contrast to perforated dies which typically tend to clog, the employment of at least one roller having transverse grooves formed therein has the advantage that impurities when placed transversely across two or more transverse grooves are comminuted by shearing and moreover are entrained and are enclosed in the extruded pressing, as is other foreign matter.

A combined device for drying sludge and other pasty materials, composed of a grooved-roller dryer and a downstream belt dryer or drum dryer or another type of hot-air dryer is known from DE 20 2010 007 475 U1 for example, wherein the grooved-roller dryer is installed in an insulated housing, and is equipped with one or a plurality of impact jet drying elements (tubes having nozzles) for additionally drying by way of hot air the pasty mass that is dried from three sides by contact drying in the grooves.

Reference is finally to be made to WO 2006/075920 A1, CN 202 322 581 U, and DE 47 162 A1.

BRIEF SUMMARY OF THE INVENTION

Proceeding therefrom, the present invention is based on the object of providing an improved feeding device of a belt drying installation for dump or sewage sludge that has been dewatered to a pasty consistency, said improved feeding device avoiding the disadvantages of the prior art, and a method for controlling such a feeding device.

This object is achieved by a feeding device of a belt drying installation, having the features of the independent device claim, and by a method for controlling such a feeding device, having the features of the main method claim.

A feeding device according to the invention of a belt drying installation for dump or sewage sludge material that has been dewatered to a pasty consistency is based on feeding devices of the generic type in that the first roller is assigned a comb which has teeth that engage in a rigid manner in the transverse grooves and which sweeps the extruded pressings from the transverse grooves;

the tips of the teeth that engage in a rigid manner in the transverse grooves define at least one line of engagement;

the tooth tips that engage in a rigid manner in the transverse grooves toward the tooth neck and the external diameter of the roller are beveled at an angle $\alpha$ that causes a cutting effect; and the teeth of the comb are disposed at an angle $\beta$ relative to a tangent that intersects the line of engagement of the roller, said angle $\beta$ causing a stripping effect.

In that, according to the invention, a comb that sweeps the extruded pressings from the transverse grooves in a rigid manner is assigned to the first roller, preferably below thereof, not only outfeeding of formed extruded pressings from the transverse grooves is ensured along a line of engagement that is defined by the teeth. Rather, a cutting effect is achieved by way of the beveling of the teeth at an angle $\alpha$, and a stripping effect in relation to the extruded pressings that are to be swept out of the transverse grooves is achieved by setting the teeth at an angle $\beta$ relative to a tangent of the roller that intersects the line of engagement. The sweeping comb according to the invention thus at the same time advantageously causes an elongation of the extruded pressings to a preferred length that is one or multiple times greater than the cross section of said extruded pressings that is formed by the transverse grooves.

Advantageous design embodiments and refinements which can be applied individually or in mutual combination are the subject matter of the dependent claims.

In a first design embodiment of the invention, angles $\alpha$ that cause a cutting effect and are between 25° and 50°, in particular between 30° and 45°, particularly preferably between 35° and 40°, have proven particularly successful.

In one further design embodiment of the invention, angles $\beta$ that cause a stripping effect and that are between 18° and 32°, in particular between 21° and 29°, particularly preferably between 24° and 26°, have proven particularly successful.

In one further design embodiment of the invention, the comb is subdivided into a plurality of segments each preferably comprising six, seven, eight, or nine teeth, wherein these segments are fitted to a transverse support in the axial direction of the roller, preferably so as to be displaceable. The engagement of the tooth tips in the transverse grooves can advantageously be initially set and/or readjusted on account of the subdivision into segments.

In one further design embodiment of the invention, the guiding means is preferably a guide plate, for example from sheet metal or plastics, or a second guide roller. Both alternatives advantageously implement shearing of in particular fibrous impurities to the extent required. Moreover, a second roller advantageously allows the application of variable and/or comparatively high compressive forces to the sludge material to be dried and to foreign matter included therein. In one refinement thereof it is preferable for the one (first) roller to be mounted so as to be rotatable counter to the other (second) roller, this advantageously causing improved drawing in of the sludge material and of foreign matter included therein.

Alternatively or additionally thereto, it is preferable for the one (first) roller to have a higher rotational speed in relation to the other (second) roller, this having the advantage of more readily guaranteeing optional shearing of fibrous impurities on the transverse grooves and/or an improved inclusion of the foreign matter in the extruded pressings.

According to the invention it is furthermore preferable for also the second roller to have transverse grooves that are set back in relation to the external diameter of said second roller. This advantageously allows the effective groove geometry to be adapted to various sludge materials and/or to the dimensions of foreign matter included therein, on the one hand. Moreover, by means of a second sweeping comb, double occupancy of the transportation belt of the belt drying installation by way of extruded pressings is enabled.

In particular, the transverse grooves of both rollers can be configured so as to be mutually offset or to be mutually opposite, such that in the first case a fixed first (comparatively small) groove cross section is advantageously effectively configured, and in the second case a fixed second (comparatively large) groove cross section is configured, wherein, alternatively or additionally thereto, the one roller can also be mounted so as to be axially displaceable relative to the other roller, such that the effective groove cross section that results from the two rollers is advantageously configurable in a variable manner, enabling a more universal application of the installation also for variable sludge materials and/or dissimilar foreign matter that is included therein.

In one further design embodiment of the present invention it is provided that the guiding means is mounted so as to be radially displaceable in relation to the first roller. This has the advantage that the guiding means in the case of a looming blockage of the transportation path T the guiding means can let a foreign body that is responsible for a looming blockage pass through. To the extent that no elongate extruded pressings are molded by virtue of such a brief widening of the transportation path T, it can be provided that this material is not fed to the belt dryer but for said material to be discharged by means of a suitable discharging device (not illustrated).

The rollers, alongside the transverse grooves formed therein, can be made as turned parts, wherein high manufacturing costs are associated therewith, however. According to the invention, rollers that are assembled from two types of segment disks are therefore preferred, wherein the diameter of the segment disks of the first type forms the external diameter of the rollers, and the diameter of the segment disks of the second type form the transverse grooves that are offset to the former, wherein segment disks which are producible in a cost-effective manner from hard rubber, plastics by means of injection molding, and/or from metal by means of laser cutting are preferable in particular. The construction of the rollers from two dissimilar alternating segment disks in particular ultimately enables cost-effective transverse grooves having a rectangular geometry to be formed in the rollers.

Irrespectively of whether made as a turned part or formed from segment disks, transverse grooves having a rectangular geometry have a plurality of simultaneous advantages:

- In this way, the edges on the circumferential periphery of the rollers guarantee shearing of foreign matter that is in particular transverse and/or excessively large and protrudes the groove geometry, that is to say comminuting of fibrous impurities or of foreign matter that is capable of deformation or shearing, without any appreciable clogging arising in the free area of the transportation path T in particular.
- Moreover, rectangular cross sections have an available passage area that is approximately 27% larger than that of round cross sections (perforated disks), this facilitating the inclusion of foreign matter and/or impurities in the sludge material.
- Finally, rectangular transverse grooves form rectangular extruded pressings which in relation to sausage-shaped moldings not only have a larger drying area but on the sides also more readily tear open in a porous manner, leading to an overall improved drying behavior.

In one further preferred design embodiment it has proven successful to dispose the feeding device relative to a transportation belt of the belt drying installation in such a manner that the line of engagement is spaced apart from the transportation belt by between 20 to 40 cm, in particular between 25 and 35 cm, particularly preferably 30 cm, wherein the shape of the extruded pressings is advantageously maintained by means of these heights of drop.

In one further preferred design embodiment it has proven successful that by means of the tips of the teeth that engage in a rigid manner in the transverse grooves of a roller, by way of alternatingly engaging at dissimilar depths, two lines of engagement are formed that are mutually offset in a parallel manner. The formation of two lines of engagement that are mutually offset in a parallel manner has the advantage of avoiding that extruded pressings that are swept out of neighboring transverse grooves are baked to one another, in particular when "soft" sludge material is used.

Finally, according to the invention the rotational speed of the drive motor of each of the rollers is capable of being set, preferably by means of a frequency inverter that is assigned to the motor. This against the background of the effect that the cutting and stripping capability of the extruded pressings that are to be swept out of the transverse grooves by means of the sweeping comb depends on the shearing strength of the dump or sewage sludge material. The stability of sludge (and of soil) is generally defined by way of the shearing strength, since the unit "viscosity" would not be appropriate here. The shearing resistance is typically measurable by means of a vane penetrometer, in particular as prescribed in DIN 4096. It had to be observed in the case of excessive roller speeds and "soft" sludge having a low shearing strength that such sludge tends to bunch up in the cutting and shearing procedure. That is to say that the extruded pressings of "soft" sludge having a low shearing strength are correspondingly deformed by the sweeping comb at high roller speeds, and excessively large pressings which are problematic in terms of the subsequent drying procedure are produced. The capability of setting the rotational speed of each of the rollers remedies the issue here. Moreover, a method for controlling a feeding device of a belt drying installation for dump or sewage sludge material that has been dewatered to a pasty consistency, in particular as has been described above, is the subject matter of the present invention, said method comprising the following steps:

- detecting the shearing strength of the sludge material;
- controlling the rotational speed of each of the rollers based on the detected shearing strength of the sludge material;
- wherein the shearing strength of the sludge material (60) is preferably detected by means of a vane penetrometer, and/or wherein the rotational speed of each of the rollers is preferably controlled by means of a frequency inverter that is assigned to the drive motor of each of the rollers.

In one refinement of the method, a controlling method has proven successful,

- in the case of which at a detected shearing strength between 0.25 and 0.75 $kN/cm^2$ the rotational speed of at least one roller is between 1.75 and 1.85 $min^{-1}$;
- in the case of which at a detected shearing strength between 0.75 and 1.25 $kN/cm^2$ the rotational speed of at least one roller is between 1.85 and 1.95 $min^{-1}$;
- in the case of which at a detected shearing strength between 1.25 and 1.75 $kN/cm^2$ the rotational speed of at least one roller is between 1.95 and 2.10 $min^{-1}$;
- in the case of which at a detected shearing strength between 1.75 and 2.25 $kN/cm^2$ the rotational speed of at least one roller is between 2.10 and 2.30 $min^{-1}$;
- in the case of which at a detected shearing strength between 2.25 and 2.75 $kN/cm^2$ the rotational speed of at least one roller is between 2.30 and 2.50 $min^{-1}$;
- in the case of which at a detected shearing strength between 2.75 and 3.25 $kN/cm^2$ the rotational speed of at least one roller is between 2.50 and 2.70 $min^{-1}$;
- in the case of which at a detected shearing strength between 3.25 and 3.75 $kN/cm^2$ the rotational speed of at least one roller is between 2.70 and 2.90 $min^{-1}$;
- in the case of which at a detected shearing strength between 3.75 and 4.25 $kN/cm^2$ the rotational speed of at least one roller is between 2.90 and 3.15 $min^{-1}$;
- in the case of which at a detected shearing strength between 4.25 and 4.75 $kN/cm^2$ the rotational speed of at least one roller is between 3.15 and 3.45 $min^{-1}$;
- in the case of which at a detected shearing strength between 4.75 and 5.25 $kN/cm^2$ the rotational speed of at least one roller is between 4.25 and 4.75 $min^{-1}$;
- in the case of which at a detected shearing strength between 5.25 and 5.75 $kN/cm^2$ the rotational speed of at least one roller is between 3.80 and 4.25 $min^{-1}$;
- in the case of which at a detected shearing strength between 5.75 and 6.25 $kN/cm^2$ the rotational speed of at least one roller is between 4.25 and 4.75 $min^{-1}$;
- in the case of which at a detected shearing strength between 6.25 and 6.75 $kN/cm^2$ the rotational speed of at least one roller is between 4.75 and 5.25 $min^{-1}$;

in the case of which at a detected shearing strength between 6.75 and 7.25 kN/cm² the rotational speed of at least one roller is between 5.25 and 5.75 min⁻¹;

in the case of which at a detected shearing strength between 7.25 and 7.75 kN/cm² the rotational speed of at least one roller is between 5.75 and 6.50 min⁻¹; and/or in the case of which at a detected shearing strength between 7.75 and 8.25 kN/cm² the rotational speed of at least one roller is between 6.50 and 7.50 min⁻¹.

The present invention has the advantage that impurities when placed transversely across two or more transverse grooves are comminuted by shearing and moreover are entrained and are enclosed in the extruded pressing, as is other foreign matter, said extruded pressing by means of the sweeping comb that causes a cutting and stripping effect in a manner favorable to drying while achieving a uniform occupancy of the transportation belt being infeedable to the belt drying installation. Thus, the factual risk of downtime in a belt drying installation by virtue of required cyclical cleaning of the belt drying installation if not advantageously eliminated can at least be drastically reduced.

Additional details and further advantages of the invention will be described hereunder by means of exemplary embodiments to which the present invention is however not limited, and in conjunction with the appended drawing.

BRIEF DESCRIPTION OF THE SEVERAL VIEWS OF THE DRAWING

In the drawing, in a schematic manner:

FIG. 1 shows a typical belt drying installation by the applicant;

FIG. 2 shows a first exemplary embodiment of a feeding device as per the invention;

FIG. 3 shows a second exemplary embodiment of a feeding device as per the invention;

FIG. 4 shows a third exemplary embodiment of a feeding device as per the invention;

FIG. 5 shows the molding of sludge material in a feeding device as per the invention into extruded pressings, and feeding the latter onto the drying belt of a belt drying installation;

DESCRIPTION OF THE INVENTION

Figure 6:
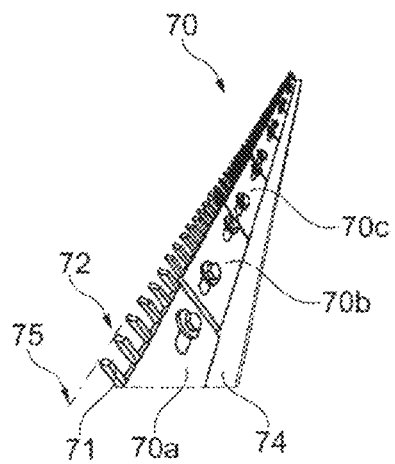
FIG. 6 shows the segments of a sweeping comb that are fitted to a transverse support, preferably so as to be longitudinally displaceable.

In the following description of preferred embodiments of the present invention, the same reference signs are used for same or equivalent components.

FIG. 1 shows a typical belt drying installation 1 by the applicant, as has already been discussed in the above description.

FIG. 2 shows a first exemplary embodiment of a feeding device 10 according to the invention of a belt drying installation 1. wherein FIG. 2a shows the feeding device 10 in a lateral view, and FIG. 2b shows the feeding device in a plan view. As can be seen in FIG. 2a, the feeding device 10 herein is adapted such that a first roller 11 having transverse grooves 14 that are set back in relation to the external diameter 15 of said first roller 11 and a guiding means 12 or 13 are disposed in the transportation path T of a material to be dried, in particular of a sludge material 60.

In the design embodiment of the invention according to FIG. 2. the guiding means is preferably a guide plate 13, for example from sheet metal or plastics. This plate 13, by means of a spring element 19, for example, is disposed relative to the external diameter 15 of the first roller 11 such that when the first roller 11 is rotated (identified by an arrow) the sludge material 60 is drawn into the transverse grooves 14 and molded into elongate extruded pressings 61. By contrast to known perforated dies which typically tend to clog, the employment according to the invention of at least one roller 11 having transverse grooves 14 formed therein has the advantage that impurities when placed transversely across two or more transverse grooves 14 are comminuted by shearing and moreover are entrained and are enclosed in the extruded pressing 61 as is other foreign matter.

The guiding means in the design embodiments of the invention according to FIG. 3 or FIG. 4 is preferably a second (guide) roller 12. Both alternatives advantageously facilitate the shearing of fibrous impurities in particular and as far as necessary. Moreover, a second (guide) roller 12 advantageously allows the application of variable and/or comparatively high compressive forces to the sludge material 60 to be dried and to foreign matter included therein.

FIG. 3 shows the second exemplary embodiment of a feeding device as per the invention, wherein FIG. 3a shows the feeding device 10 in a lateral view, and FIG. 3b shows the feeding device 10 in a plan view. As is identified by means of arrows, it is preferable for the one (first) roller 11 to be mounted so as to be rotatable counter to the other (second) roller 12, this advantageously causing improved drawing in of the sludge material 60 and of foreign matter included therein.

The two rollers 11 and 12 can have identical rotational speeds. Alternatively thereto, a design embodiment in which the one (first) roller 11 has a higher rotational speed in relation to the other (second) roller 12 can be preferable, this having the advantage of more readily guaranteeing optional shearing of fibrous impurities on the transverse grooves 14 and/or an improved inclusion of the foreign matter in the extruded pressings 61.

As is highlighted by FIG. 3b, the second roller 12 preferably also has transverse grooves 14 that are set back in relation to the external diameter of said second roller 12. This advantageously allows the effective groove geometry to be adapted to various sludge materials 60 and/or to the dimensions of foreign matter included therein. In particular, the transverse grooves 14 of both rollers 11 and 12 can be configured so as to be mutually opposite, as is illustrated in FIG. 3b, such that a fixed maximum effective groove cross section is advantageously configured in this case.

FIG. 4 shows a third exemplary embodiment of a feeding device as per the invention, wherein FIG. 4a shows the feeding device 10 in a lateral view, and FIG. 4b shows the feeding device 10 in a plan view. As for FIG. 4a, reference is made to the explanations pertaining to FIG. 3a. By contrast to the design embodiment of FIG. 3b, FIG. 4b highlights how the transverse grooves 14 of both rollers 11 and 12 can be configured so as to be mutually offset, such that a fixed first minimum effective groove cross section of 10 mm diameter, for example, or in the case of the rectangular grooves 14 described hereunder of approximately 10×10 mm, for example, is advantageously configured.

Alternatively or additionally thereto, the one roller 11 or 12 can also be mounted so as to be axially displaceable relative to the other roller 12 or 11, such that the effective groove cross section of approximately 10×20 mm, for example, that results from the two rollers 11 and 12 is advantageously configurable in a variable manner, as is illustrated and explained in FIG. 3 on the one hand and in FIG. 4 on the other hand, enabling a more universal application of the installation 1 also for variable sludge materials 60 and/or dissimilar foreign matter that is included therein.

FIG. 4c shows the pair of rollers 11 and 12 of FIG. 4b in a perspective fragmented view; FIG. 4d in the housing of a feeding device 10 of a belt drying installation 1. Sizes of 300 mm+/−50 mm have preferably been chosen as the size of diameter, respectively, of the rollers 11 and 12. These dimensions have proven to be a favorable compromise between the drawing-in reliability of the material 60 to be dried (comparatively large rollers 11 and 12 have improved drawing-in) and the total weight to be transported and the cost of a feeding device 10 as per the invention. In particular, one roller 11 has been mounted in a fixed manner, and the second roller 12 has been mounted in a readjustable manner such that the gap between both rollers 11 and 12 can be readjusted. Furthermore, both rollers 11 and 12 have preferably been driven by one gear motor each. The employment of gear motors as opposed to hydraulically driven axial piston motors has the advantage that there are no additional hydraulic apparatuses that increase the cost of the system. Moreover, a drive motor which is preferably readjustable in rotational speed by means of a frequency inverter can be chosen, on account of which continuous readjustment of the rotational speed of the rollers in a wide range is advantageously possible, which can be important for settings that have to be made during operation. This against the background of the effect that the cutting and stripping capability of the extruded pressings 61 that are to be swept out of the transverse grooves 14 by means of the sweeping comb 70 depends on the shearing strength of the dump or sewage sludge material 60. The stability of sludge (and of soil) is generally defined by way of the shearing strength, since the unit "viscosity" would not be appropriate here. The shearing resistance is typically measurable by means of a vane penetrometer (not illustrated) which is preferably disposed in the transportation path T of the sludge material 60, in particular as prescribed in DIN 4096. It had to be observed in the case of excessive roller speeds and "soft" sludge 60 having a low shearing strength that such sludge 60 tends to bunch up in the cutting and shearing procedure. That is to say that the extruded pressings 61 of "soft" sludge 60 having a low shearing strength when measured by means of a vane penetrometer also called vane shearing strength are correspondingly deformed by the sweeping comb 70 at high roller speeds, and excessively large pressings which are problematic in terms of the subsequent drying procedure are produced. Accordingly, the significance of the revolving or circumferential speed, respectively, when drawing in feed material has been established so as to be preferably as follows:

| Vane shear strength kN/cm² | Rotational speed of roller 1/min | Circumferential speed m/s |
|---|---|---|
| 0.5 | 1.80 | 0.030 |
| 1.0 | 1.90 | 0.032 |
| 1.5 | 2.00 | 0.033 |
| 2.0 | 2.20 | 0.037 |
| 2.5 | 2.40 | 0.040 |
| 3.0 | 2.60 | 0.043 |
| 3.5 | 2.80 | 0.047 |
| 4.0 | 3.00 | 0.050 |
| 4.5 | 3.30 | 0.055 |
| 5.0 | 3.60 | 0.060 |
| 5.5 | 4.00 | 0.067 |
| 6.0 | 4.50 | 0.075 |
| 6.5 | 5.00 | 0.083 |
| 7.0 | 5.50 | 0.092 |
| 7.5 | 6.00 | 0.100 |
| 8.0 | 7.00 | 0.117 |

Finally, frequency inverters can be set in a relatively precise manner in terms of increased current pick up so that a rotation monitoring unit simultaneously stops the machine and triggers an malfunction signal in the case of a stoppage of the rollers 11 and 12 by virtue of malfunction or maintenance.

In one further design embodiment of the present invention it is provided that the guiding means 12 or 13 are mounted so as to be radially displaceable in relation to the first roller 11, such as is implemented in FIG. 2a with the aid of spring elements 19, for example, such that the occasional drawing-in of comparatively large lumps also does not lead to undesirable downtime of the installations 1. Rather, in the case of a looming blockage of the transportation path T, the guiding means 12 or 13 can allow foreign matter that is responsible for a looming blockage to pass through by way of a brief widening the transportation path T. To the extent that no elongate extruded pressings 61 are molded by virtue of such widening, it can be provided that this material is not fed to the belt dryer 1 but is previously discharged from the transportation path T by means of a suitable discharging device (not illustrated).

Alternatively thereto, a device (not illustrated) for the preliminary comminution of the feed material 60, which comminutes lumps of more than 40 mm or 50 mm in size to 30 mm or 20 mm, for example, can be disposed upstream of the feeding device 10.

FIG. 5 shows the molding of sludge material 60 in a feeding device 10 as per the invention into extruded pressings 61, and feeding of the latter onto the drying belt 20 of a belt drying installation 1. It can be seen how a comb 70 that sweeps the extruded pressings 61 from the transverse grooves 14 is disposed in particular below each of the rollers 11 and 12.

FIG. 6 shows the segments 70a, 70b, 70c, . . . of a sweeping comb 70 that are fitted to a transverse support 74, preferably so as to be longitudinally displaceable. It can moreover be seen how the ends 72 of the teeth 71 define a line of engagement 75.

Figure 7:
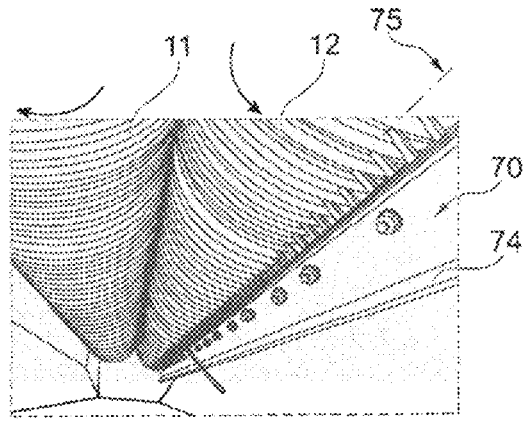
FIG. 7 shows the sweeping comb of FIG. 6 below the right roller of a pair of rollers, in a perspective view.

FIG. 7 shows the sweeping comb 70 of FIG. 6 below the right roller 12 of a pair of rollers 11 and 12, in a perspective view. It can be furthermore seen how the ends 72 of the teeth 71 which define a line of engagement 75 engage in a rigid manner in the transverse grooves 14 of the roller 12.

Figure 8:
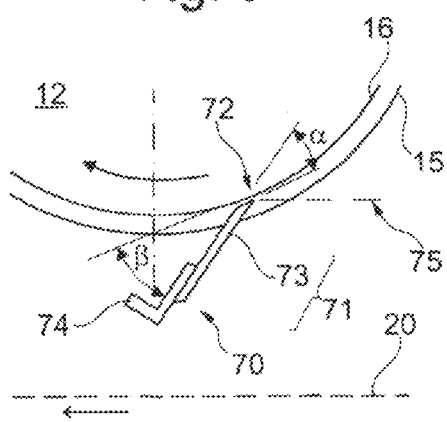
FIG. 8 in a lateral view shows the tooth of a sweeping comb that defines at least one line of engagement, the tooth end thereof being beveled toward the tooth neck and the internal diameter (defined by the depth of the transverse grooves) of the roller.

FIG. 8 in a lateral view shows the tooth 71 of a sweeping comb 70 that defines at least one line of engagement 75 when engaged in a transverse groove 14 of the left roller 11 of a pair of rollers 11, 12, having a tooth end 72 that is beveled toward the tooth neck 73 and toward the internal diameter of the roller 11 (said internal diameter being defined by the depth of the transverse grooves 14).

Figure 9:
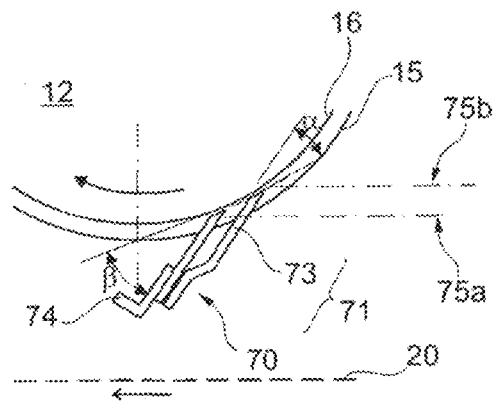
FIG. 9 shows the sweeping comb in a manner analogous to FIG. 8 in a lateral view, having two teeth, each defining one line of engagement that is defined by two tooth tips that alternatingly engage at dissimilar depths.

FIG. 9 shows the sweeping comb 70 in a manner analogous to FIG. 8, in a lateral view, having two teeth 71 each defining one line of engagement 75a and 75b formed by tooth tips 72 that alternatingly engage at dissimilar depths. The formation of two parallel lines of engagement 75a and 75b that are mutually offset in a parallel manner by at least two to optionally six centimeters has the advantage of avoiding that extruded pressings that are swept out of neighboring transverse grooves 14 are baked to one another, in particular when "soft" sludge material is used.

Figure 10:
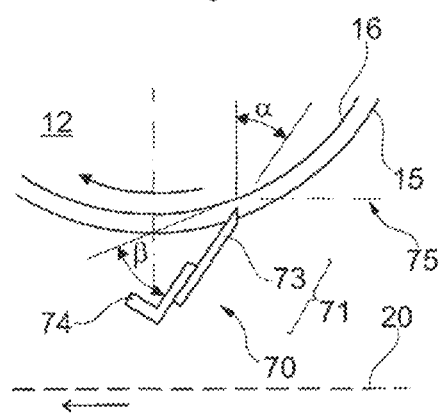
FIG. 10 shows in a lateral view the tooth of a sweeping comb that defines the at least one line of engagement when engaged in a transverse groove of the left roller of a pair of rollers, having a tooth end that is beveled toward the tooth neck and the external diameter of the roller.

FIG. 10 in a lateral view shows the tooth 71 of a sweeping comb 70 that defines at least one line of engagement 75, when engaging in a transverse groove 14 of the left roller 11 of a pair of rollers 11, 12, having a tooth end 72 that is beveled toward the tooth neck 73 and the external diameter 15 of the roller 11.

Figure 11:
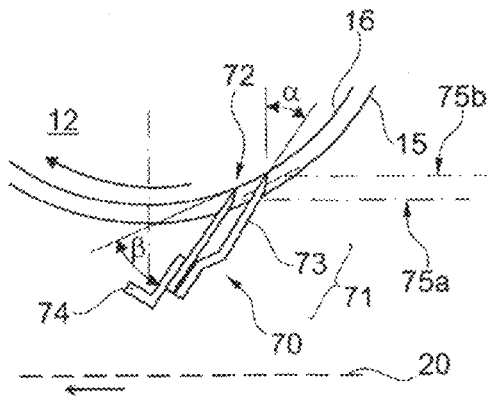
FIG. 11 shows the sweeping comb in a manner analogous to FIG. 10 in a lateral view, having two teeth, each defining one line of engagement that is formed by tooth tips that alternatingly engage at dissimilar depths.

Finally, FIG. 11 shows the sweeping comb 70 in a manner analogous to FIG. 10, in a lateral view, having two teeth 71, each defining one line of engagement 75a and 75b, formed by tooth tips 72 that alternating engage at dissimilar depths.

The sweeping combs 70 that are illustrated in an exemplary manner in FIGS. 6 to 11 not only ensure discharging of molded extruded pressings 61 from the transverse grooves 14, said sweeping combs can the same time advantageously also cause an elongation of the extruded pressings 61 to a preferred length that is one or multiple times greater than the cross section of said extruded pressings 61 that is formed by the transverse grooves 14. It is furthermore illustrated in FIGS. 6 to 11 how the feeding device 10 is disposed relative to a transportation belt 20 of the belt drying installation 1 in such a manner that the line of engagement 75, or the lines of engagement 75a and 75b, respectively, are spaced apart from the transportation belt 20 by between 20 to 40 cm, in particular between 25 and 35 cm, particularly preferably by 30 cm, wherein the shape of the extruded pressings 61 is advantageously maintained by means of these heights of drop.

The rollers 11 and/or 12, alongside the transverse grooves 14 formed therein, can be made as turned parts, wherein high manufacturing costs are associated therewith, however. According to the invention, rollers 11 or 12, respectively, that are assembled from two types of segment disks 16, 17 are therefore preferred, as is illustrated in FIG. 2b. It can be seen how the diameter of the segment disks 17 of a first type forms the external diameter 15 of the rollers 11 and 12, respectively, and the diameter of the segment disks 16 of a second type forms the transverse grooves 14 that are offset to the former. The segment disks 16 and 17 which are illustrated in FIG. 2b can be producible in a cost-effective manner from hard rubber, from plastics by means of injection molding, and/or from metal by means of laser cutting. Said segment disks 16 and 17 are alternatingly push fitted onto an axle journal 18, for example, thus offering an easy configuration of rollers 11 and/or 12 in a variable length that suffices for the respective application.

The construction of the rollers 11 and 12 from two dissimilar alternating segment disks 16 and 17 in particular ultimately enables cost-effective transverse grooves 14 having a rectangular geometry to be formed in the rollers 11 and 12.

The limitation of the end faces of cost-effective disks 16 and 17 being flat herein and thus not allowing a specific, in particular sausage-shaped shaping of the pressings, did not prove to be disadvantageous. Transverse grooves 14 having a rectangular geometry indeed comprise a plurality of advantages:

The edges that are on the circumferential periphery 15 of the rollers 11 or 12, respectively, guarantee shearing of foreign matter that in particular lies transversely and/or is excessive in size and protrudes beyond the groove geometry, that is to say in particular the comminution of fibrous impurities or of deformable or shearable foreign matter, without appreciable clogging arising in the free area of the transportation path T.

Moreover, rectangular cross sections 14 have an available passage area that is approximately 27% larger than that of round cross sections (perforated disks), this facilitating the inclusion of foreign matter and/or impurities in the sludge material 60.

Finally, rectangular transverse grooves 14 form rectangular extruded pressings 61 which in relation to sausage-shaped moldings not only have a larger drying area but on the sides also more readily tear open in a porous manner, leading to an overall improved drying behavior. In particular, it has been demonstrated in laboratory tests that the flow loss of hot air 41 perfused rectangular pressings in relation to round pressings was not measurable higher at an air speed of 1.5 m/s.

The present invention has the advantage that impurities when placed transversely across two or more transverse grooves 14 are comminuted by shearing and moreover are entrained and are enclosed in the extruded pressing 61, as is other foreign matter. Thus, the factual risk of downtime in a belt drying installation 1 by virtue of required cyclical cleaning of the feeding device 10 if not advantageously eliminated was at least able to be drastically reduced.

LIST OF REFERENCE SIGNS

1 Belt drying installation
10 Feeding device
11 First roller
12 Guide roller
13 Guide plate
14 Transverse grooves configured in rollers 11 and 12
15 External diameter of the rollers
16 Groove segment
17 Roller segment
18 Axle journal
19 Spring element
20 Transportation belt
30 Drying zone
31 First drying chamber
32 Second drying chamber
33 Third drying chamber
34 Fourth drying chamber
40 Ventilation system
41 Hot air
42 Exhaust air blower
50 Heat exchanger
60 Material to be dried, dump or sewage sludge, for example
61 Extruded pressings
62 Pile
63 Dried goods 70 Sweeping comb
70a, 70b, . . . Segments of sweeping comb 70
71 Teeth of sweeping comb 70
72 Tooth tips
73 Tooth neck
74 Transverse support
75. 75a, 75b Line(s) of engagement
80 Infeeding conveyor unit
81 Metering unit
82 Outfeeding conveyor unit
T Transportation path

The invention claimed is:

1. A feeding device of a belt drying installation for dump or sewage sludge material being dewatered to a pasty consistency, the feeding device comprising;
    at least one first roller having transverse grooves formed therein being set back in relation to an external diameter of said first roller and being disposed in a transportation path of the sludge material
    a guiding device disposed in the transportation path relative to said external diameter of said first roller, said first roller and said guiding device disposed such that when said first roller is rotated the sludge material is drawn into said transverse grooves and molded into elongate extruded pressings;
    a comb assigned to said first roller and having teeth engaging in a rigid manner in said transverse grooves and sweeping the elongate extruded pressings from said transverse grooves, said teeth having tips engaging in a rigid manner in said transverse grooves and defining at least one line of engagement;
    said tips engaging in said transverse grooves being beveled toward a tooth neck and the external diameter of said first roller, said bevel running at an angle α causing a cutting effect; and
    said teeth of said comb being disposed at an angle β relative to a tangent that intersects the line of engagement of said first roller, the angle β causing a stripping effect.

2. The feeding device according to claim 1, wherein the angle α that causes the cutting effect is between 25° and 50°.

3. The feeding device according to claim 1, wherein the angle β that causes the stripping effect is between 18° and 32°.

4. The feeding device according to claim 1,
    further comprising a transverse support; and
    wherein said comb is subdivided into a plurality of segments each containing six, seven, eight, or nine of said teeth, and said segments are fitted to said transverse support in an axial direction of said first the roller so as to be displaceable.

5. The feeding device according to claim 1, wherein said guiding device is a guide plate or a second roller mounted so as to be rotatable counter to said first roller.

6. The feeding device according to claim 5, wherein one of said first and second rollers has a higher rotational speed in relation to the other of said first and second rollers.

7. The feeding device according to claim 5,
    wherein said second roller has transverse grooves formed therein being set back in relation to an external diameter of said second roller;
    further comprising a further comb assigned to said second roller, said further comb having teeth engaging in a rigid manner in said transverse grooves of said second roller and which sweeps the elongate extruded pressings from said transverse grooves of said second roller;
    wherein said teeth of said second roller having tips that engage in a rigid manner in said transverse grooves and define at least one line of engagement;
    wherein said tips engage in said transverse grooves are beveled toward a tooth neck and said external diameter of said second roller, said bevel having an angle α that causes a cutting effect; and
    wherein said teeth of said further comb are disposed at an angle β relative to a tangent that intersects the line of engagement of said second roller, said angle β causing a stripping effect.

8. The feeding device according to claim 7, wherein said transverse grooves of said first and second rollers are configured so as to be mutually offset or so as to be mutually opposite, to which end one of said first and second rollers is mounted so as to be displaceable in relation to an other of said first and second rollers in an axial manner.

9. The feeding device according to claim 1, wherein said guiding device is mounted so as to be radially displaceable in relation to said first roller.

10. The feeding device according to claim 5, wherein said first and second rollers are assembled from segment disks which are produced from hard rubber, from plastics by means of injection molding, and/or from metal by means of laser cutting.

11. The feeding device according to claim 7, wherein said transverse grooves in said first and second rollers have a rectangular shape.

12. The feeding device according to claim 1, wherein the feeding device is disposed relative to a transportation belt of the belt drying installation in such a manner that the at least one line of engagement is spaced apart from the transportation belt by between 20 and 40 cm.

13. The feeding device according to claim 7, wherein said tips of said teeth engage in the rigid manner in said transverse grooves of said first and second rollers by way of alternatingly engaging at dissimilar depths and form two lines of engagement that are mutually offset in a parallel manner.

14. The feeding device according to claim 1, wherein the angle α that causes the cutting effect is between 35° and 40°.

15. The feeding device according to claim 1, wherein the angle β that causes the stripping effect is between 24° and 26°.

16. The feeding device according to claim 1, wherein the feeding device is disposed relative to a transportation belt of the belt drying installation in such a manner that the at least one line of engagement is spaced apart from the transportation belt by 30 cm.

17. A method for controlling a feeding device of a belt drying installation for dump or sewage sludge material that has been dewatered to a pasty consistency, which comprises the following steps of:
    providing the feeding device according to claim 7;
    detecting a shearing strength of the sludge material by means of a vane penetrometer; and
    controlling a rotational speed of each of the first and second rollers based on a detected shearing strength of the sludge material, by means of a frequency inverter that is assigned to a drive motor of each of the first and second rollers.

18. The method according to claim 17, wherein:
    in a case of when the detected shearing strength is between 0.25 and 0.75 kN/cm$^2$ the rotational speed of at least one of the first and second rollers is between 1.75 and 1.85 min$^{-1}$;

in a case of when the detected shearing strength is between 0.75 and 1.25 kN/cm$^2$ the rotational speed of at least one of the first and second rollers is between 1.85 and 1.95 min$^{-1}$;

in a case of when the a detected shearing strength between 1.25 and 1.75 kN/cm$^2$ the rotational speed of at least one of the first and second rollers is between 1.95 and 2.10 min$^{-1}$;

in a case of when the detected shearing strength is between 1.75 and 2.25 kN/cm$^2$ the rotational speed of at least one of the first and second rollers is between 2.10 and 2.30 min$^{-1}$;

in a case of when the detected shearing strength is between 2.25 and 2.75 kN/cm$^2$ the rotational speed of at least one of the first and second rollers is between 2.30 and 2.50 min$^{-1}$;

in a case of when the detected shearing strength is between 2.75 and 3.25 kN/cm$^2$ the rotational speed of at least one of the first and second rollers is between 2.50 and 2.70 min$^{-1}$;

in a case of when the detected shearing strength is between 3.25 and 3.75 kN/cm$^2$ the rotational speed of at least one of the first and second rollers is between 2.70 and 2.90 min$^{-1}$;

in a case of when the detected shearing strength is between 3.75 and 4.25 kN/cm$^2$ the rotational speed of at least one of the first and second rollers is between 2.90 and 3.15 min$^{-1}$;

in a case of when the detected shearing strength is between 4.25 and 4.75 kN/cm$^2$ the rotational speed of at least one of the first and second rollers is between 3.15 and 3.45 min$^{-1}$;

in a case of when the detected shearing strength is between 4.75 and 5.25 kN/cm$^2$ the rotational speed of at least one of the first and second rollers is between 4.25 and 4.75 min$^{-1}$;

in a case of when the detected shearing strength is between 5.25 and 5.75 kN/cm$^2$ the rotational speed of at least one of the first and second rollers is between 3.80 and 4.25 min$^{-1}$;

in a case of when the detected shearing strength is between 5.75 and 6.25 kN/cm$^2$ the rotational speed of at least one of the first and second rollers is between 4.25 and 4.75 min$^{-1}$;

in a case of when the detected shearing strength is between 6.25 and 6.75 kN/cm$^2$ the rotational speed of at least one of the first and second rollers is between 4.75 and 5.25 min$^{-1}$;

in a case of when the detected shearing strength is between 6.75 and 7.25 kN/cm$^2$ the rotational speed of at least one of the first and second rollers is between 5.25 and 5.75 min$^{-1}$;

in a case of when the detected shearing strength is between 7.25 and 7.75 kN/cm$^2$ the rotational speed of at least one of the first and second rollers is between 5.75 and 6.50 min$^{-1}$; and in a case of when the detected shearing strength is between 7.75 and 8.25 kN/cm$^2$ the rotational speed of at least one of the first and second rollers is between 6.50 and 7.50 min$^{-1}$.

\* \* \* \* \*